US 6,573,676 B1

(12) United States Patent
Klesing

(10) Patent No.: US 6,573,676 B1
(45) Date of Patent: Jun. 3, 2003

(54) DRIVE DEVICE AND METHOD FOR MOVING A VEHICLE PART

(75) Inventor: Joachim Klesing, München (DE)

(73) Assignee: Webasto Dachsysteme GmbH, Stockdorf (DE)

(*) Notice: Subject to any disclaimer, the term of this patent is extended or adjusted under 35 U.S.C. 154(b) by 0 days.

(21) Appl. No.: 09/786,390

(22) PCT Filed: Sep. 3, 1999

(86) PCT No.: PCT/EP99/06508
§ 371 (c)(1),
(2), (4) Date: Jun. 1, 2001

(87) PCT Pub. No.: WO00/14843
PCT Pub. Date: Mar. 16, 2000

(30) Foreign Application Priority Data

Sep. 3, 1998 (DE) .......................... 198 40 164

(51) Int. Cl.$^7$ ................................. H02H 7/08
(52) U.S. Cl. .................. 318/445; 318/174; 318/280; 318/283; 318/286; 318/432; 318/434; 318/466; 318/469
(58) Field of Search ................. 318/174, 280, 318/283, 466, 469, 432, 286, 434, 445; 701/49

(56) References Cited

U.S. PATENT DOCUMENTS

| 5,530,329 A | * | 6/1996 | Shigematsu et al. | 318/469 |
| 5,717,302 A | * | 2/1998 | Sakai et al. | 318/374 |
| 5,977,732 A | * | 11/1999 | Matsumoto | 318/283 |
| 5,994,858 A | * | 11/1999 | Miura | 318/283 |
| 6,100,658 A | * | 8/2000 | Kume et al. | 318/286 |

FOREIGN PATENT DOCUMENTS

| DE | 29 26 938 | | 1/1981 | |
| DE | 43 12 865 | | 11/1993 | |
| DE | 43 21 264 | | 1/1994 | |
| DE | 42 11 495 | | 10/1994 | |
| DE | 195 11 581 | | 10/1995 | |
| DE | 196 18 219 | | 11/1997 | |
| DE | 198 40 161 A1 | * | 3/2000 | .......... H02H/7/085 |
| DE | 198 40 163 A1 | * | 3/2000 | .......... H02H/7/085 |
| DE | 198 40 164 A1 | * | 3/2000 | .......... H02H/7/085 |
| EP | 0 582 966 | | 2/1994 | |

* cited by examiner

Primary Examiner—Robert E. Nappi
Assistant Examiner—Tyrone Smith
(74) Attorney, Agent, or Firm—Nixon Peabody LLP; David S. Safran

(57) ABSTRACT

A process for displacing a motor vehicle part between at least two positions and a drive device for executing this process in which the motor vehicle part is driven by an electric motor (10), a pulse signal is generated according to the rotary motion of the electric motor (10) and is supplied to a control unit (24) for controlling the electric motor (10), and the instant of input of each signal on the control unit (24) is acquired. Furthermore, at certain instants, a respective for the change of motor rpm is determined from at least some of these previously measured instants, from each value of the rpm change a force change value ($\Delta F^*[k]$) is computed and at least some of the previously determined values of the force change are added up with weighting in order to determine the value for the instantaneous force acting on the moveable motor vehicle part. This value is used as the criterion in deciding whether or not the electric motor (10) is turned off or reversed. In the computation of the values of the force change, for each value of the rpm change which exceeds an upper threshold, the value of this upper threshold is used instead of the value of the rpm change.

17 Claims, 4 Drawing Sheets

DRIVE DEVICE AND METHOD FOR MOVING A VEHICLE PART

BACKGROUND OF THE INVENTION

1. Field of the Invention

The invention relates to a process for adjusting a motor vehicle part between at least two positions and a drive device for a motor vehicle part which can be adjusted between at least two positions.

2. Description of Related Art

Published German Patent Application DE-OS 29 26 938 discloses a generic process and a generic drive device. Here, in a sliding roof drive, at uniform time intervals, the motor rpm is acquired, the differences of successive values are found, these differences are added to one another when they are larger than a predetermined threshold value, and shut-off or reversal of the motor is triggered as soon as the added sum exceeds a predetermined threshold value.

Published German Patent Application DE 43 21 264 A1 discloses a generic process and a generic drive device. Here, an electric motor drives a motor vehicle window pane. By means of two Hall sensors which are offset by 90 degrees and which interact with a magnet located on the motor shaft, a signal is produced from which the instantaneous period duration of a motor revolution and thus the instantaneous motor rpm are determined at each time at which one such signal enters a control unit for controlling the motor. As soon as the instantaneous rpm change resulting from the difference of two successive rpm measured values exceeds a stipulated threshold value, the motor is reversed in order to release a possibly pinched article.

Published German Patent Application DE 195 11 581 A1 discloses a similar drive device in which, however, the threshold value is variably chosen depending on the position, a memory for certain positions of the adjustment path storing the speed change acquired in an earlier run between two adjacent positions, in order to compute therefrom as a function of position depending on the last currently acquired position and speed the shut-off threshold for the speed.

Published German Patent Application DE 43 12 865 A1 discloses a drive device for a motor vehicle window which acquires the motor rpm by means of two Hall detectors, and which reverses the motor when a threshold is exceeded for the relative change of rpm. In doing so, the threshold value is continually recomputed depending on the acquired motor voltage and the ambient temperature which is determined by a temperature sensor on the motor. In doing so, the status/operating times of the motor are considered in order to be able to draw conclusions about the ambient temperature from the motor temperature.

Published German Patent Application DE 196 18 219 A1 and its corresponding U.S. Pat. No. 6,070,116, disclose determining the rpm threshold or the rpm change threshold of the motor, starting from which reversal of the motor takes place, from the position-dependent rpm data of a reference run which has taken place beforehand depending on the position of the cover for a sliding roof drive. More specifically, to prevent faulty actuation of motor reversal or stoppage, a calculated value is produced from a set of measured values and is compared with two limit values, and only when both limit values are exceeded, is the motor stopped or reversed.

The disadvantage in these generic drive devices which acquire the rpm is that there is not sufficient compensation for vibration influences, for example, when driving over a highly uneven road. Vibrations can lead to serious fluctuations of the rpm, especially also to a periodic fast drop I the motor rpm so that a case of pinching is incorrectly recognized and the motor is turned off or reversed. Thus, there is not always sufficient reliability of the pinching protection.

German Patent DE 42 11 495 C2 discloses pinching protection for blind, awning, louver or swinging door motors, motor torque being monitored for shutting off the motor. The motor is turned off as soon as it has been determined that a limit value for the motor torque has been exceeded a predetermined number of times.

SUMMARY OF THE INVENTION

The object of this invention is to devise a drive device for a motor vehicle part which can be moved between at least two positions and a process for adjusting a movable motor vehicle part between at least two positions, by which more reliable acquisition of pinching of an article or body part is obtained.

This object is achieved in accordance with the present invention by a process and by a drive device as described in detail below.

In accordance with the invention, it is advantageous that pinching protection can be optimized in the case of vibration by cutting off overly great changes of rpm.

The upper threshold is preferably chosen to be variable. In this way, the trigger accuracy can be further increased.

The upper threshold is chosen preferably depending on the last determined value of the rpm change or some of the last determined values of the rpm change. This represents an especially feasible embodiment.

In another advantageous embodiment, it is provided that the weight of the value of the force change is zero if the value is below a lower threshold, while the weight for all successive values which exceed this threshold is one. This introduction of a lower limit for consideration of rpm changes or force changes makes it possible to reduce the possibility of faulty triggering due to very slow changes of the action of the force.

Two embodiments of the invention are explained in detail below using the attached drawings.

DETAILED DESCRIPTION OF THE INVENTION

Figure 1:
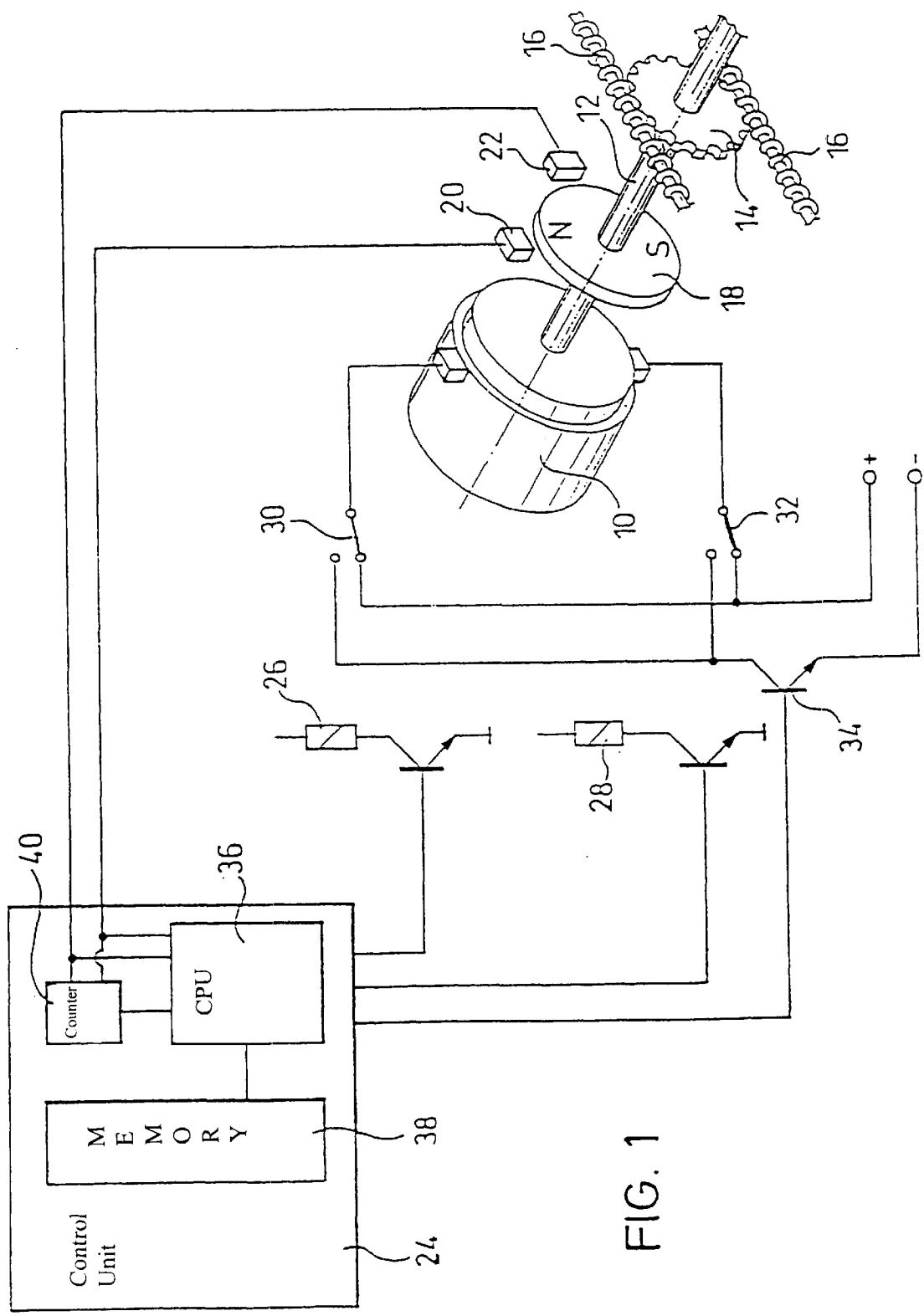
FIG. 1 shows a schematic of a drive device in accordance with the invention.
Figure 4:
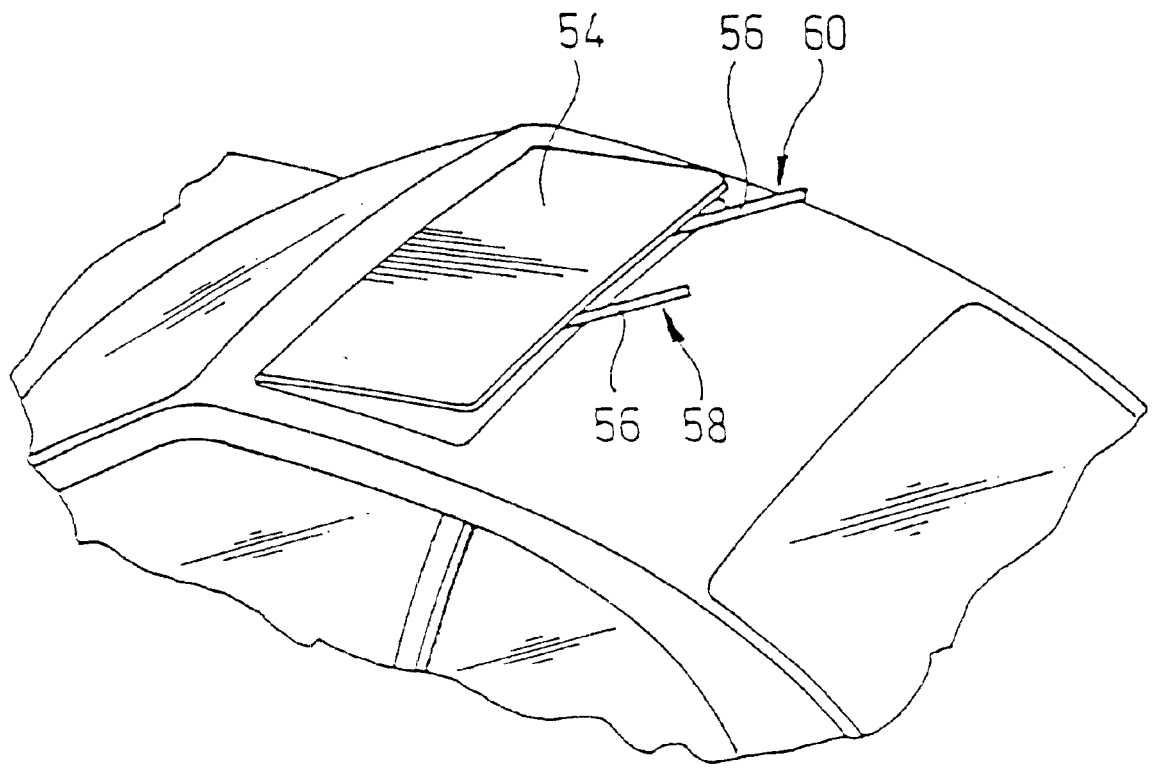

With reference to FIG. 1, an electric motor 10 which is made as a DC motor drives via a shaft 12 a pinion 14 which engages two drive cables 16 which are guided to be resistant to tension and compression. Between the electric motor 10 and the pinion 14, there is optionally another worm gear pair which is not shown. The movable covers 54 of the sliding motor vehicle roofs, currently mostly made as sliding and lifting roofs or spoiler roofs, are generally driven by means of these drive cables 16. The window raisers of a motor vehicle door often act via a cable drum and a smooth cable on the movable part, i.e., the window. It is irrelevant for the following examination how the force is applied to the movable motor vehicle part. Preferably, the cover 54 of a sliding and lifting roof which, however, for the sake of better clarity is only shown in FIG. 4 is driven.

A magnet wheel 18 with at least one south pole and one north pole is mounted on the shaft 12 so as to rotate therewith. Of course, there can also be several, for example, four north poles and four south poles, on the magnet wheel 18, by which the period duration of the signals is shortened accordingly. In the peripheral direction offset by roughly 90 degrees, near the magnet wheel 18, there are two Hall sensors 20, 22 each of which deliver a pulse signal for each passage of the north and south pole of the magnet wheel 18 to a control unit 24 which is provided with a microprocessor 36 and a memory 38 and which thus receives a signal for roughly each quarter revolution of the shaft 12. The period duration results from the interval of two successive signals on the same sensor 20 and 22 which are part of the interval of one complete revolution of the shaft 12. Due to the 90 degree arrangement of the two sensors 20, 22, the period duration is computed alternately from the time difference of the last two signals on the sensor 20 and 22 so that, for each quarter revolution, a new value of the period duration is available. By this type of determining the period duration, deviations from the exact 90 degree geometry of the sensor arrangement have no effect on the period duration, as would be the case when the period duration is determined from the time difference between the last signal of one sensor and of the other sensor.

As a result of the phase shift of the signals of the two sensors 20, 22, the direction of rotation can also be determined. In addition, the current position of the cover 54 can be determined from the signals of the Hall sensors 20, 22 by these signals being supplied to a counter 40 which is assigned to the control unit 24.

The direction of rotation of the electric motor 10 can be controlled by the control unit 24 via two relays 26, 28 with reversing contacts 30, 32. The rpm of the motor 10 are controlled by pulse width modulation via a transistor 34 which is triggered by the control unit 24.

From the instant of signal input from the Hall sensors 20 and 22, the microprocessor 36 determines the instantaneous period duration of the revolution of the shaft 12, and thus, of the electric motor 10. Thus, roughly for each quarter turn of the shaft 12, a measured value for the period duration is available. To ensure pinching protection between these instants as well, estimated values for the period duration are continuously extrapolated in a fixed time reference, for example, after each 1 ms, from preceding measured values of the period duration, for example, according to the following formula $$T^*[k]=T[i]+k \cdot (a1 \cdot T[i-1]+a2 \cdot T[i-2]+a3 \cdot T[i-3]) \quad (1)$$

a1, a2, a3 being parameters, i being an index which for each signal input, i.e., for each quarter period, is incremented, and k being the running index of the fixed time reference which is reset to zero for each new measured value for the period duration. Instead of the last four measured values, depending on the requirement, also more or fewer measured values can be considered, for example, only the last two.

Figure 2:
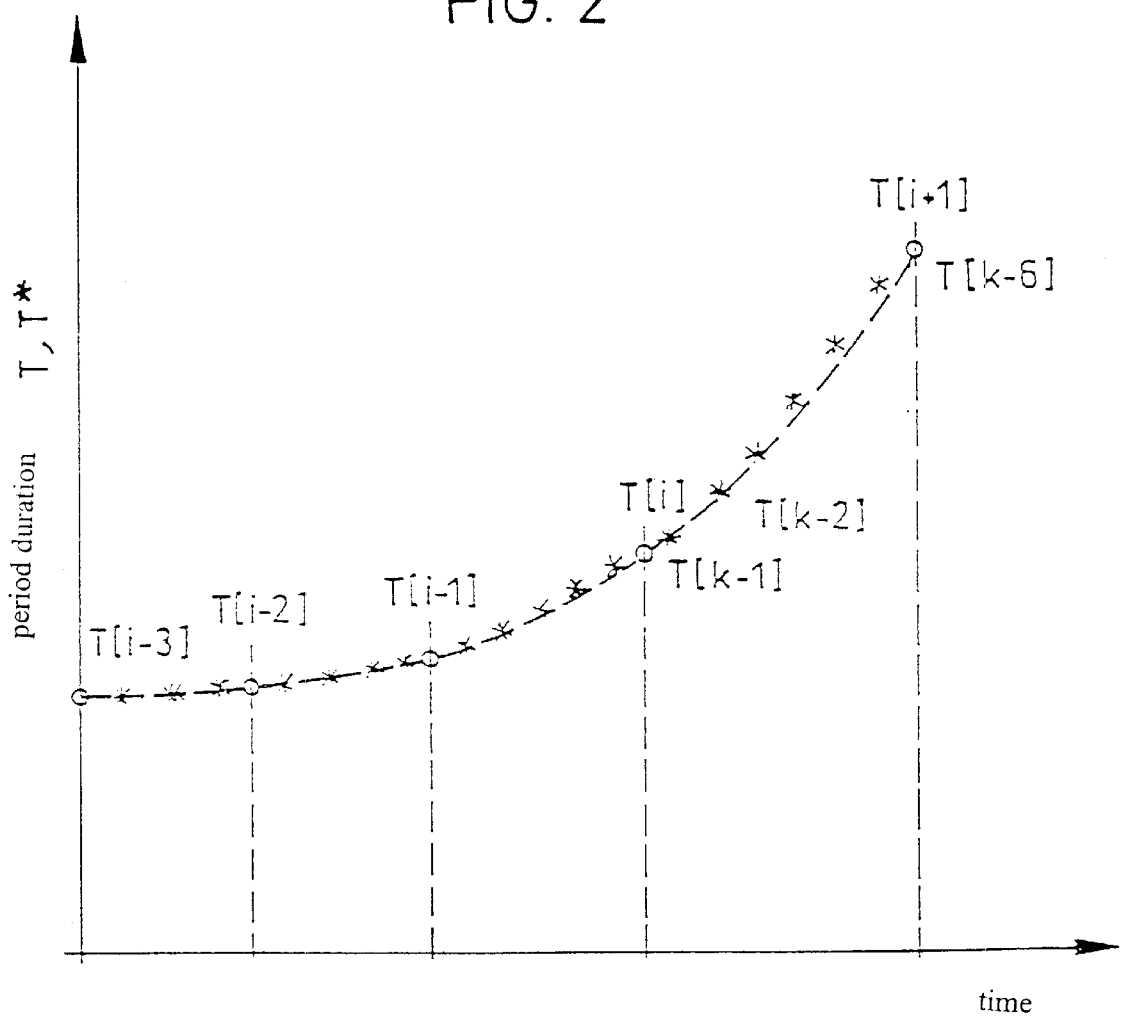
FIG. 2 shows a graphic representation of a sample time behavior of the period duration of a motor revolution.

The parameters a1, a2, a3 model the entire system of the drive device, i.e., the motor 10, the force transmission components and the cover, and are determined by the spring stiffnesses, damping and friction of the entire system. This yields bandpass action with the property that spectral portions of the period time behavior caused by vibrations are evaluated more weakly than those originating from a case of pinching. FIG. 2 schematically shows the sample time behavior of the measured period durations T and the period durations T* which have been estimated therefrom. The broken-line curve represents the true behavior of the period duration.

From the estimated values for the period duration which have been determined in this way, then the rpm change at time [k] relative to the preceding instant [k−1] is estimated, a motor voltage filter and a path profile filter being used to eliminate the effects of the motor voltage and the position at which the movable motor vehicle part, i.e., the cover, is in fact located, on the motor rpm, the following formula being used:

$$\Delta N^*[k]=(T^*[k]-T^*[k-1])/(T^*[k])^2-Vu(Um[k])-Vr(x[k]) \quad (2)$$

Um[k] being the motor voltage at time [k], Vu being the motor voltage filter which simulates the relationship between the rpm and the motor voltage which has been acquired by the control unit 24, x[k] being the position of the cover at time [k] and Vr being a path profile filter which simulates the relationship between the motor rpm and the position of the cover.

The motor voltage filter Vu simulates the dynamic behavior of the motor for voltage changes. Preferably the motor voltage filter Vu is made as a lowpass filter with a time constant which is equal to the motor time constant. The time constant is dependent on the operating case, i.e., on the opening or closing of the cover 54 in the sliding or lowering direction, and on the magnitude of the voltage change.

The path profile filter Vr is automatically determined by a learning run after the drive device is installed. The position of the cover 54 is, as mentioned above, determined from the pulse signals of the Hall sensors 20, 22 which are added up by means of the counter 40.

The decision whether a case of pinching is present or not is made using the following formula:

$$\Sigma(Vf \cdot \Delta N^*[k]) = \Sigma(\Delta F[k]) > F\text{max} \quad (3)$$

The estimated rpm changes $\Delta N^*[k]$ are compared to a fixed, time-constant lower boundary. As soon as they exceed this lower boundary, they are each multiplied by a proportionality factor Vf which reproduces the steepness of the motor characteristic of the electric motor 10 (torque over rpm). At a constant motor voltage and motor temperature, the steepness is roughly constant, but for each electric motor 10 it is individually different. To eliminate these effects, on the one hand, a temperature sensor acquires the ambient temperature and the motor temperature is approached via the acquisition of the operating duration (instead the ambient temperature can also be directly acquired by a temperature sensor on the electric motor 10). On the other hand, for each electric motor 10, before connection to the cover 54 within the framework of the final production check, at a constant motor voltage, two pairs of values for rpm and torque are determined and stored in a memory 38. From these measured values, the rise of the motor characteristic is determined, from which the proportionality factor Vf is computed.

The product of $\Delta N^*[k]$ and Vf corresponds to the change $\Delta F[k]$ of the force acting on the displacement motion of the cover 54 at time [k] relative to the instant [k−1].

The values of $\Delta F[k]$ are added up as long as the values of $\Delta N^*[k]$ are above the fixed lower boundary. As soon as two successive Δ*[k] values are again below it, the sum is set to zero. If the ΔN*[k] value exceeds a fixed upper boundary, in place of this ΔN*[k] only the value of the upper boundary is included in the sum. This is used to eliminate as much as possible the effects of vibrations which lead to brief periodic peaks of the rpm change on the recognition of a case of pinching. This upper boundary can be chosen to be constant in the simplest case. In order to increase the accuracy of triggering, however, the upper limit can also be chosen differently in time depending on the currently determined rpm change, for example, in the form that the upper limit is raised as the current rpm change rises.

As soon as the sum of ΔF[k] exceeds a maximum allowable pinching force Fmax, the control unit 24 by triggering the relays 26, 28 via the switches 30, 32 initiates reversal of the electric motor 10 in order to again immediately release the pinched article or the pinched body part.

Thus, the pinching protection is also active due to the described extrapolation of the period durations between the two measured values of the period duration at fixed instants, by which a case of pinching can be recognized earlier, i.e., at a lower pinching force; this better prevents damage or injuries and thus increases the safety of the drive device.

Figure 3:
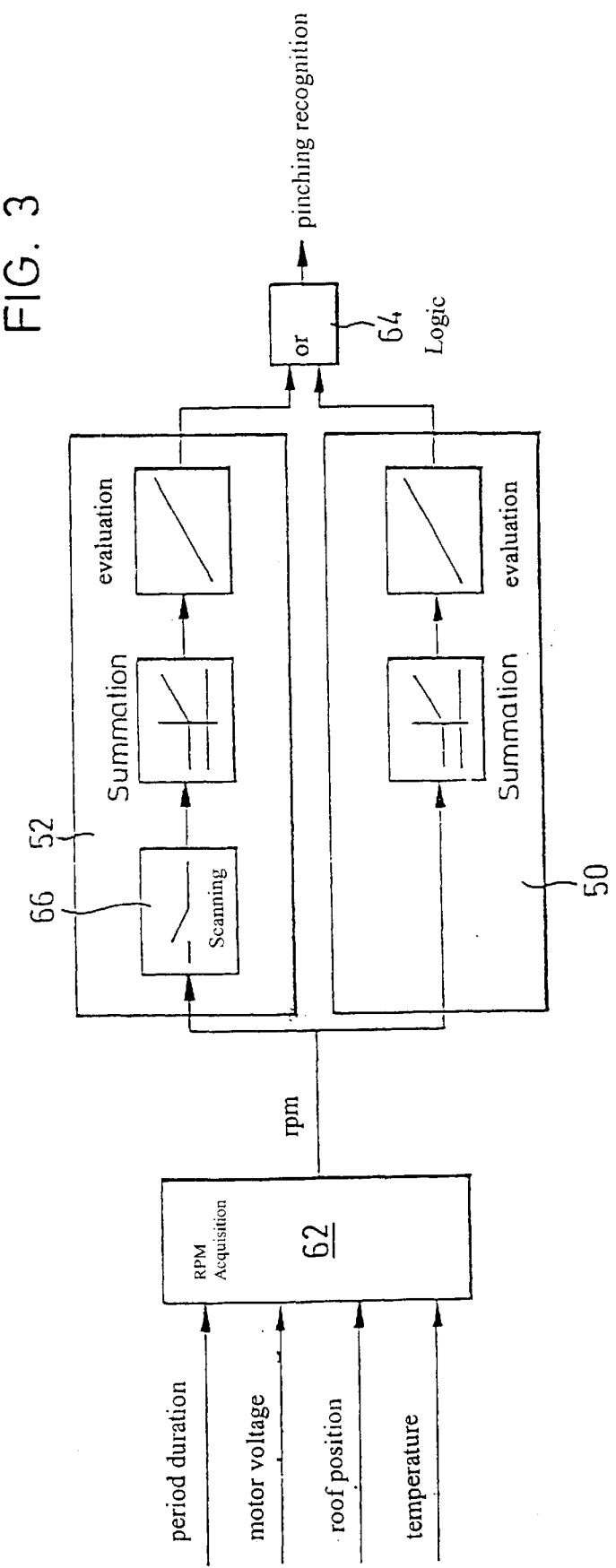
FIG. 3 shows a schematic of one embodiment of the process in accordance with the invention for determining a case of pinching, and FIG. 4 schematically shows a motor vehicle roof for illustration of the process as shown in FIG. 3.

FIG. 3 schematically shows a second embodiment of the invention. The major difference from the above described first embodiment is that parallel and independently of the extrapolation of the measured period durations in accordance with the invention at certain times and of the determination of estimated values for the force acting on the adjustable motor vehicle part in a first computation 50, a second computation 52 is carried out with its own set of parameters and with a different scanning rate which likewise delivers the value for the instantaneous action of the force. For the decision whether the motor is to be turned off or reversed, the results of the two computations are considered in a logic stage 64 in the form of an OR operation. This results from the following considerations:

The stiffness of the entire system is composed of the stiffnesses of the sliding and lifting roof mechanism, of the pinched body, and of the motor vehicle body. On the one hand, the stiffness of the pinched body depends on the type of body. On the other hand, the stiffness of the vehicle body depends largely on the location at which the body is pinched. This applies especially in the lowering motion of the cover 54 from a raised position, see FIG. 4. If in doing so a body 56 is pinched in the area of the middle of the roof (indicated in FIG. 4 at 58), the entire system, based on the possible deflection of the rear edge of the cover, is much softer than for pinching in the edge area (indicated in FIG. 4 at 60).

The scanning rate is hereinafter defined as the interval of the instants at which the value for the instantaneous action of the force is determined. If the system is working with a single fixed scanning rate, the set of parameters of the computation, especially the threshold values or the boundary values, and the selected scanning rate can be optimized only for a single stiffness of the entire system, but in practice, depending on the type and location of the pinched body, different stiffnesses of the entire system can be decisive.

By carrying out a second parallel computation 52, it is possible to optimize this second computation 52 for another stiffness by the corresponding choice of the computation parameters and the scanning rate underlying the computation, i.e., the choice of the instants at which a new value of the instantaneous action of force is computed.

The second computation 52 is preferably optimized for acquisition of slow changes of the action of force, i.e., small stiffnesses, while the first computation 50 is optimized for the acquisition of fast changes of the action of force, i.e., high stiffnesses.

Generally, in the secondary computation 52, it is not necessary to extrapolate the measured values of the period duration, but depending on the relevant stiffness range, in any case after input of a new measured value or only after each n-th input of the measured value, the computation 52 of the new value of the instantaneous action of force is performed. But basically, if necessary, the second computation 52 can use an extrapolation algorithm, the extrapolation instants being chosen at a greater interval than in the first computation 50.

As shown in FIG. 3, in the rpm acquisition stage 62, from the input values period duration T, motor voltage, cover position x and motor temperature according to the aforementioned formulas (1) and (2) with the first (higher) scanning rate, i.e., at the measurement instants [i] and the extrapolation instants [k], the current rpm change ΔN* or the current rpm N* is determined (this results from N*[k]=1/T*[k]−Vu(Um[k])−Vr(x[k]; instead of [k], there can also be [i]). Furthermore, when determining the rpm in the conversion from the change in rpm to the change in force, the motor temperature is taken into account according to equation (3). The first scanning rate is chosen such that it is optimum for acquisition of cases of pinching with the highest system stiffnesses to be expected. The rpm acquisition stage 62 is used jointly by the first computation 50 and the second computation 52.

In the first computation 50, it is ascertained from the rpm change ΔN* by means of the formula (3) in the aforementioned manner using the first value for the fixed lower boundary, the first value for the fixed upper boundary, and the first value for the threshold value Fmax at the instants which have been established by the first scanning rate, i.e. the extrapolation instants [k], whether the instantaneous action of the force exceeds this first threshold value Fmax. The values of this first parameter set are optimized for the acquisition of cases of pinching with the largest system stiffness to be expected.

In the second computation 52, the scanning rate is chosen such that it is optimum for acquisition of cases of pinching with the lowest system stiffnesses to be expected. This second scanning rate can be chosen, for example, such that only each fourth measured value of the period duration T is considered. In this case, the second computation is performed only for each fourth signal input from the Hall sensors 20, 22, i.e., only each fourth rpm N[i] which is determined by the stage 62 and which goes back to the measured period duration T, is considered in the scanning stage indicated at 66 in FIG. 3. The rpm N*[k] which have been determined from the extrapolated period durations T are, of course, ignored anyway. The second computation 52 is therefore carried out only at each fourth instant [i].

First, the change of rpm ΔN[i] is determined relative to the last measured value. Then, analogously, by means of the equation (3), using a second value for the fixed lower boundary, a second value for the fixed upper boundary, and a second value for the threshold value Fmax is established, whether the instantaneous action of force exceeds this second threshold value Fmax. The values of this second parameter set are optimized for acquisition of cases of pinching with the smallest system stiffness to be expected.

For the decision whether there is a case of pinching, i.e., the motor is to be turned off or reversed, the results of the first and the second computation are logically combined with one another in the logic stage 64. In the simplest case, it is an OR operation. In this case, therefore, the motor is turned off or reversed when one of the two computations has acquired a case of pinching. The decision is made at each instant at which the first computation 50 delivers a new result. Since new results of the second computation 52 are present much more rarely, the last result of the second computation 52 is supplied to the logic stage 64.

Both fast and soft changes of the action of the forces can be optimally acquired by the combination of the results of the two computations 52, 54.

What is claimed is:

1. Process for displacing a motor vehicle part between at least two positions, comprising the steps of:

driving the motor vehicle part by a rotary electric motor, generating pulse signals proportionally to the rotary motion of the electric motor, supplying the pulse signals to a control unit for controlling the motor, acquiring the instant of input of each signal to the control unit, and at certain instants, determining a respective value for the change of motor rpm from at least some of previously measured instants, from each value for the change of motor rpm, computing a force change value, and adding up at least some of the previously determined values of the force change with weighting in order to determine a value for the instantaneous force acting on the moveable motor vehicle part, the value for the instantaneous force being used as a criterion deciding whether or not the electric motor is turned off or reversed, wherein in the computation of the values of the force change, for each value for the change of motor rpm which exceeds an upper threshold, the value of the upper threshold is used instead of the value of the rpm change for computing the force change value.

2. Process as claimed in claim 1, wherein the upper threshold value is variable.

3. Process as claimed in claim 2, wherein the upper threshold value is chosen depending on at least some of the determined values of the rpm change.

4. Process as claimed in claim 3, wherein the upper threshold value is chosen as a function of the last determined value of the change of motor rpm.

5. Process as claimed in claim 1, wherein the value of the force change is assigned a weight value of zero, if the value of the force change is below a lower threshold, while all successive values which exceed said lower threshold is assigned a weight value of one.

6. Process as claimed in claim 1, wherein each value of the change of motor rpm or the value of the upper threshold which is used instead of the value of the change of motor rpm is multiplied by a proportionality factor in order to determine a corresponding value of the force change.

7. Process as claimed in claim 6, wherein the proportionality factor is chosen as a function of a motor characteristic.

8. Process as claimed in claim 7, wherein the motor characteristic is determined for at least one motor voltage before startup with the motor being uncoupling from the driven vehicle part.

9. Process as claimed in claim 8, wherein the motor characteristic is determined by measuring two pairs of values of motor rpm and torque at a fixed motor voltage.

10. Process as claimed in claim 7, wherein the proportionality factor is chosen as a function of motor temperature.

11. Process as claimed in claim 10, wherein the motor temperature is estimated from the ambient temperature and the length of operation of the electric motor.

12. Process as claimed in claim 1, comprising the further step of shutting off or reversing the electric motor by the control unit as soon as an estimated value for the instantaneous force exceeds a predetermined trigger threshold.

13. Process as claimed in claim 1, wherein the value for the instantaneous force acting on the motor vehicle part is determined between pulse signal input instants at certain extrapolation instants.

14. Process as claimed in claim 13, comprising the further steps of determining the measured value of the current motor rpm at inputting of a new pulse signal from a difference relative to at least one earlier pulse signal measured value, determining an estimate of the current rpm at each extrapolation instant by consideration of at least one previously determined rpm, and determining a value for rpm change from the current rpm estimates.

15. Process as claimed in claim 14, wherein the value of the rpm change is determined from the difference of the current rpm estimates and the current rpm estimate for the preceding extrapolation instant, the current rpm estimate for each extrapolation instant resulting from the sum from the last measured current rpm estimate and a parameter-weighted sum of several current rpm estimates measured before the last measured period duration, the weighted sum being multiplied by the time which has passed since the last measurement.

16. Drive device for a motor vehicle part which can be moved between at least two positions, comprising:

a rotary electric motor for driving the motor vehicle part, a control unit for controlling the motor, means for producing pulse signals according to rotary motion of the electric motor for supplying the pulse signals to the control unit for controlling the motor, wherein the control unit has means for acquiring the instant of receipt of each of the pulse signals received at the control unit, for determining, at certain instants, a respective value for a motor rpm change from at least some of previously determined instants, for computing a force change value from each value of motor rpm change, for adding up at least some of the previously determined force change values with weighting in order to determine a value for the instantaneous force acting on the moveable motor vehicle part, and for using the value for the instantaneous force as the criterion for deciding whether or the electric motor is turned off or reversed, wherein said means of the control unit is adapted to perform the computing of the force change values for each value of the rpm change which exceeds an upper threshold value using the value of the upper threshold instead of the value of the rpm change.

17. Drive device as claimed in claim 16, wherein the control unit is adapted to use a variable as the upper threshold value.

* * * * *